United States Patent
Hiermeier et al.

(10) Patent No.: US 9,334,344 B2
(45) Date of Patent: May 10, 2016

(54) PROCESS FOR THE PRODUCTION OF A POLYVINYL-CHLORIDE (PVC) RESIN

(75) Inventors: Johann Hiermeier, Cologne (DE); Ulrich Lauter, Burghausen (DE); Peter Voth, Engelsberg (DE)

(73) Assignee: VINNOLIT GMBH & CO. KG, Isamaning (DE)

(*) Notice: Subject to any disclaimer, the term of this patent is extended or adjusted under 35 U.S.C. 154(b) by 1246 days.

(21) Appl. No.: 13/240,291

(22) Filed: Sep. 22, 2011

(65) Prior Publication Data

US 2012/0095176 A1 Apr. 19, 2012

Related U.S. Application Data

(60) Provisional application No. 61/385,287, filed on Sep. 22, 2010.

(51) Int. Cl.
| C08F 2/18 | (2006.01) |
| C08F 14/06 | (2006.01) |
| C08F 114/06 | (2006.01) |
| C08F 214/06 | (2006.01) |

(52) U.S. Cl.
CPC .............. *C08F 114/06* (2013.01); *C08F 14/06* (2013.01); *C08F 2/18* (2013.01); *C08F 214/06* (2013.01)

(58) Field of Classification Search
CPC ...... C08F 14/06; C08F 114/06; C08F 214/06; C08F 2/18
See application file for complete search history.

(56) References Cited

U.S. PATENT DOCUMENTS

| 3,555,122 A | 1/1971 | Simons .......................... 525/239 |
| 3,661,881 A | 5/1972 | Moore et al. .................. 260/92.8 |
| 3,787,187 A | 1/1974 | DeWitt .......................... 23/285 |
| 3,945,985 A | 3/1976 | Feiler et al. ............. 260/92.8 W |
| 3,954,698 A | 5/1976 | Bradley et al. ................... 526/79 |
| 4,031,299 A | 6/1977 | Wei ................................ 526/193 |
| 4,385,163 A | 5/1983 | Nakamura et al. ............. 526/199 |
| 4,456,735 A | 6/1984 | Engelmann et al. ........... 525/317 |
| 5,739,222 A | 4/1998 | Kobayashi et al. .............. 526/87 |
| 2007/0078217 A1 | 4/2007 | Kim et al. ...................... 524/502 |
| 2010/0267912 A1 | 10/2010 | Ahn et al. ...................... 526/195 |

FOREIGN PATENT DOCUMENTS

| CA | 1205243 | 5/1986 |
| CN | 1288476 | 3/2001 |
| CN | 101506249 | 8/2009 |
| DE | 1645668 | 9/1970 |
| DE | 1694312 | 4/1971 |
| DE | 2240252 | 2/1973 |
| DE | 130260 | 3/1978 |
| DE | 157907 A1 | 4/1981 |
| DE | 3138064 | 5/1982 |
| DE | 3544235 C2 | 10/1993 |
| EP | 0054153 B1 | 6/1984 |
| EP | 0612766 A1 | 2/2009 |
| EP | 1710260 B1 | 1/2010 |
| FR | 1376130 A | 11/1963 |
| GB | 1164008 | 9/1969 |
| GB | 1396743 | 6/1975 |
| GB | 1487991 | 10/1977 |
| JP | S56-807 | 6/1979 |
| JP | S59-168008 | 3/1983 |
| WO | WO 81/01005 | 4/1981 |
| WO | WO 97/40076 A1 | 10/1997 |
| WO | WO 00/31156 | 6/2000 |
| WO | WO 2007/032630 A9 | 3/2007 |

OTHER PUBLICATIONS

"PVC Degradation & Stabilization," George Wypych, ChemTec Publishing, 2008, p. 36.*
Allen, T. "Particle Size, Shape, and Distribution" *Particle Size Measurement* London, England: Chapman and Hall LTD, 1968 pp. 21-33.
Cadle, R.D. "Sampling Methods" *Particle Size Determination* New York, New York: Interscience Publishers, Inc., 1955 pp. 92-101.
International Standard "Particle Size Analysis—Laser Diffraction Methods" ISO 13320:2009(E) pp. 1-51.
Lines, R. "Sizing Up the Options for Particle Characterisation" Process Engineering 1990 56-61.
Rey, A. and Rey-Debove, J. "Le Petit Robert" *Dictionaire* Paris, France: Avenue Parmentier, 1990 pp. 535 and 1916.
Wiley-Interscience Publication "vol. 17 Transitions and Relaxations to Zwitterionic Polymerization" *Encyclopedia of Polymer Science and Engineering* New York, New York: John Wiley & Sons, 1989 pp. 295-329.
Wilkes et al. "Polymerization, Safety and Environment, and Specialty Grade PVC Resins" *PVC Handbook* Munich, Germany: Hanser Publishers, 2005 pp. 57-74, 93-94, 365-371, 393-394.
Notice of Opposition to EP2433971, Dec. 5, 2012.
Maaβ et al. "Prediction of Drop Sizes for Liquid—Liquid Systems in Stirred Slim Reactors—Part 1: Single Stage Impellers" Chemical Engineering Journal 2010 vol. 162:792-801.
Maaβ et al. "Prediction of Drop Sizes for Liquid—Liquid Systems in Stirred Slim Reactors—Part II: Multi Stage Impellers" Chemical Engineering Journal 2011 vol. 168:827-838.

* cited by examiner

*Primary Examiner* — Richard A Huhn
(74) *Attorney, Agent, or Firm* — Licata & Tyrell P.C.

(57) ABSTRACT

The present invention relates to a process for the production of polyvinyl chloride (PVC) having a median grain size of from 10 to 80 μm by suspension polymerization of vinyl chloride, the process comprising the following process steps:
(a) introduction of water, initiator(s), optionally one or more further adjuvants, and some of the vinyl chloride into a container as initial charge and mixing of the constituents;
(b) dispersion, and addition of one or more suspension auxiliaries with continued dispersion;
(c) heating of the mixture;
(d) addition of the remaining vinyl chloride; and
(e) working-up of the product.

13 Claims, No Drawings

PROCESS FOR THE PRODUCTION OF A POLYVINYL-CHLORIDE (PVC) RESIN

This application claims the benefit of U.S. Provisional Application No. 61/385,287 filed Sep. 22, 1010, which is herein incorporated by reference in its entirety.

The present invention relates to a process for the production of a PVC extender (blending resin).

For the production of soft PVC articles in accordance with the so-called plastisol or paste process, finely pulverulent polymer resins are dispersed in liquid organic plasticizers. The mixture is called a plastisol. For the production of such plastisols there are preferably used polymer resins having grain sizes of between 100 nm and 2 µm which are obtained by means of emulsion, microsuspension or miniemulsion methods. The most important property for the processing of such plastisols is their viscosity, the so-called paste viscosity. Depending upon the processing technique or the desired plasticizer content in the article produced, the viscosity of the plastisol can vary from thinly liquid to doughy. One of the main applications of paste technology is in painting and coating processes in which the plastisol used is intended to provide desired flow characteristics, the objective generally being low viscosity at relatively high shear speeds in order to allow higher processing speeds or thinner coats.

It is known that by adding relatively large PVC particles it is possible to reduce paste viscosity while the proportions by weight of PVC (polyvinyl chloride) and plasticizer remain the same. In particular, it is possible thereby fully or partially to suppress dilatancy, that is to say an increase in viscosity at higher shear rates. The PVC types known as extender PVC or blending resins are suitable for that purpose.

Extender PVC resins typically have a median grain size ($d_{50}$) of from 20 to 60 µm. They are usually produced by dispersing and stabilizing a homogeneous mixture of vinyl chloride and an initiator, usually a water-insoluble initiator, (optionally in the presence of further adjuvants) in water using suspension auxiliaries by vigorous stirring or with the aid of a dispersing device to form droplets of suitable size which then fully polymerize after being heated to a typical polymerization temperature. By the use of sufficient amounts of suspension auxiliaries, the droplets, unlike normal S-PVC polymerization, remain stabilized during the entire polymerization phase and polymerize individually to form the polymer particle without further coagulation or agglomeration. The production of such extender types is described, for example, in DE 1 645 668, GB 1 487 991, U.S. Pat. No. 4,031,299 and EP 0 054 153.

The very great difference in density between vinyl chloride and the resulting polyvinyl chloride results in a shrinkage in volume, there being formed grains having a generally wrinkled "raisin-like" appearance. The irregular and not entirely non-porous structure having a large number of indentations is typical of the blending resins produced in accordance with this process.

The problem of the present invention was to provide a process for the production of a PVC resin (especially of an extender PVC resins) by means of which the properties of the extender PVC resins can be optimized. A particular problem was to provide a process for the production of a PVC extender as well as an extender PVC resin which allows the viscosity-reducing action in the paste application to be significantly improved. Those problems are solved by the process according to the invention and by the PVC resin according to the invention.

The present invention relates to a process for the production of polyvinyl chloride (PVC) or a PVC resin (especially extender PVC or an extender PVC resin, respectively) having a median grain size of from 10 to 80 µm by polymerization (especially by suspension polymerization) of vinyl chloride, which process comprises the following process steps:

(a) introduction of water, initiator(s), optionally one or more further adjuvants, and some of the vinyl chloride into a reactor as initial charge and mixing of the constituents;

(b) dispersion, and addition of one or more suspension auxiliaries with continued dispersion;

(c) heating of the mixture;

(d) addition of the remaining vinyl chloride; and (e) working-up of the product.

The present invention relates also to a polyvinyl chloride (PVC) or a PVC resin (especially an extender PVC or an extender PVC resin, respectively) which can be produced by the process according to the invention.

The reactor is preferably a polymerization autoclave.

In the process it is preferable to maintain the described order of process steps (a) to (c). Due to technical incidents it is also possible to depart from that order and to carry out steps (a) to (c) simultaneously or in some other order.

As initiators there are preferably used one or more water-insoluble organic diacyl peroxides, peroxy esters, peroxodicarbonates or azo compounds.

The following compounds are specific examples of such initiators: diacetyl-, didecanoyl-, acetylbenzoyl-, dilauroyl-, dibenzoyl-, diisobutyryl-, di-(3,5,5-trimethylhexanoyl)- and bis-2,4-dichlorobenzoyl-peroxide, diisopropyl percarbonate, di-(3-methoxybutyl)-, di-(4-tert.-butylcyclohexyl)-, di-sec.-butyl-, dicetyl-, dimyristyl- and diethylhexyl-peroxodicarbonate, cumyl-, 1,1,3,3-tetramethyl-butyl-, tert.-amyl-, tert.-butyl- and 1,1-dimethyl-3-hydroxybutyl-peroxyneodecanoate, tert.-butyl- and cumyl-peroxyneoheptanoate, tert.-amyl- and tert.-butyl-peroxypivalate, 2,2'-azo(diisonitrile) and tert.-butyl hydroperoxide. Preference is given to the use of the following initiators: dilauroyl peroxide, dicetyl-, dimyristyl- and diethyl hexyl-peroxodicarbonate.

As adjuvants there are preferably used molecular weight regulators, cross-linkers, anti-oxidants, pH regulators and/or ionic and non-ionic surfactants.

As molecular weight regulators there can be used, for example, aliphatic aldehydes having from 2 to 8 carbon atoms, chlorinated or brominated hydrocarbons, bromoform, methylene chloride, and also mercaptans.

Furthermore, there can also be present monomers having at least two ethylenically unsaturated, non-conjugated double bonds which are generally also termed cross-linkers, such as, for example, (meth)acrylic acid esters of polyhydric alcohols, such as, for example, ethylene glycol dimethacrylate, propylene glycol dimethacrylate, butylene glycol acrylate, trimethylene glycol acrylate or trimethylolpropane triacrylate, also vinyl and allyl esters of unsaturated C3 to C8 monocarboxylic acids, mono-, di-vinyl and di-allyl esters of saturated or unsaturated C4 to C10 dicarboxylic acids, and also triallyl cyanurate and other allyl ethers of polyfunctional alcohols.

As antioxidants there are preferably used one or more sterically hindered phenols.

Specific and preferred examples of antioxidants used are: di-tert.-butyl-4-hydroxy-toluene, octadecyl-3-(3,5-di-tert.-butyl-4-hydroxyphenyl)propionate, 2,6-di-tert.-butyl-4-sec.-butylphenol, ethylenebis(oxyethylene)bis[3-(5-tert.-butyl-4-hydroxy-m-tolyl)-propionate] and 2,4-dimethyl-6-(1-methylpentadecyl)phenol.

As pH regulators there are preferably used citric acid, sodium bicarbonate and/or some other buffer salt. Preference is also given to sodium nitrite as an adjuvant.

Further examples of pH regulators are alkali metal acetates, borax, alkali metal phosphates, alkali metal dihydrogen phosphates, dialkali metal hydrogen phosphates, alkali metal carbonates, alkali metal hydrogen carbonates, ammonia or ammonium salts of carboxylic acids.

Preferably, in the process according to the invention, in step (a) from 20 to 80% by weight of the total vinyl chloride are added, especially from 30 to 70% by weight, more especially from 40 to 60% by weight (for example about 50% by weight).

Preferably in step (b) a median droplet size of from 10 to 80 µm, preferably from 20 to 60 µm, especially from 20 to 40 µm, is established.

Dispersion is understood in general as mixing of a liquid phase into a different, immiscible, coherent, liquid phase, whereby it is divided into small droplets (disperse phase).

Preferably, in step (b) one or more suspension auxiliaries are added, especially for stabilizing the droplets.

Suspension auxiliaries, also referred to as protective colloids, are generally water-soluble, surface-active, natural or synthetic polymers that assist the formation of droplets of the disperse phase and prevent the resulting droplets from merging.

Examples of suspension auxiliaries are: gelatin, polyvinylpyrrolidone and copolymers of vinyl acetate and vinyl pyrrolidone, water-soluble cellulose derivatives, such as carboxymethylcellulose, methylcellulose, hydroxyethylcellulose, hydroxypropylcellulose, hydroxypropylmethylcellulose ether, aminocellulose, and also co-polymers of maleic acid or semi-esters thereof with styrene, and polyvinyl alcohols that still contain acetate groups between 10 and 60 mol %. Special preference is given to partially acetylated polyvinyl alcohols, which still contain from 15 to 30 mol % acetate groups and a 4% by weight aqueous solution of which has a viscosity of up to 200 mPas at 20° C., and water-soluble cellulose ethers, such as hydroxypropylmethylcellulose ether, a 2% by weight aqueous solution of which has a viscosity of from 10 to 200 mPas (at 20° C.).

Preferably, in addition to the suspension auxiliaries it is also possible for one or more ionic and/or non-ionic surfactants, such as, for example, alkanesulfonates or sorbitan esters, to be added before or during step (b).

Examples of ionic surfactants are: alkali metal, alkaline earth metal or ammonium salts of fatty acids, such as lauric, myristic, palmitic or stearic acid; of acidic fatty alcohol/sulfuric acid esters, of alkanesulfonic acids, especially having a hydrocarbon chain of from 10 to 18 carbon atoms, of alkylarylsulfonic acids, such as dodecyl-benzene- or dibutylnaphthalene-sulfonic acid, of sulfosuccinic acid dialkyl ester, and also alkali metal and ammonium salts of epoxidized fatty acids, such as epoxy-stearic acid or epoxidized soybean oil, of reaction products of peracids (for example peracetic acid) with unsaturated fatty acids, such as oleic, linoleic or ricinoleic acid. Further examples are: alkyl betaines (dodecyl betaine), alkyl pyridinium salts (such as lauryl pyridinium hydrochloride), alkyl ammonium salts (such as oxyethyldodecyl ammonium chloride).

Examples of non-ionic surfactants are: fatty acid esters of polyhydric alcohols, such as glycerol monostearate and sorbitan monolaurate, oleate or palmitate, and various oligo- or poly-oxyethyl compounds, such as polyoxyethylene esters of fatty alcohols or aromatic hydroxy compounds.

Preferably, in step (d) from 20 to 80% by weight of the total vinyl chloride are added, especially from 30 to 70% by weight, more especially from 40 to 60% by weight (for example about 50% by weight).

Preferably, in step (d) the addition of the remaining vinyl chloride is effected from the beginning of the heating until the working-up. Especially preferably, in step (d) the remaining vinyl chloride is added during the polymerisation phase from the beginning of the heating phase until the pressure starts to drop. The drop in pressure generally refers to the point in the polymerization phase at which the pressure in the reactor begins to fall while the internal temperature remains the same. That point is generally reached at a conversion (=ratio of the amount of polymerized VC to the total amount of VC used) of about 70%. Especially preferably, the vinyl chloride is metered-in in such a way that during that period the amount of remaining vinyl chloride that is added at least corresponds to the amount converted, that is to say converted from monomer to polymer, or exceeds that amount.

Especially preferably, in step (d) the addition of the remaining vinyl chloride is effected in such a way that during the polymerization period (from heating to common pressure drop) the shrinkage in volume is at all times at least balanced by addition of the remaining vinyl chloride.

As a result of the polymerization process, the disperse phase is caused to shrink in volume as a result of the great difference in density between monomeric vinyl chloride and the substantially denser polyvinyl chloride.

Preferably, in step (d) the addition of the remaining vinyl chloride begins once the polymerization temperature has been reached.

Preferably, the addition of the remaining vinyl chloride in step (d) is effected up until a pressure drop of more than 10% in the reactor, especially up until a pressure drop of 5%.

In turn, it is preferable for the addition of the remaining vinyl chloride in step (d) to be effected in such a way that the total fill volume in the reactor changes by less than 10% (especially by less than 5%) during the addition of the remaining vinyl chloride.

Preferably, in step (d) the remaining vinyl chloride is added over a period of from 30 to 600 min.

In turn, it is preferable for the addition of the vinyl chloride in step (d) to be effected continuously or (preferably intermittently) in a plurality of (preferably equal) portions.

Preferably, in step (c) the mixture is heated to the polymerization temperature; preferably to from 40 to 80° C.

The terms "PVC extender", "extender PVC resin" and "blending resin" are known to the person skilled in the art and are described, for example, in the following literature references:

1) Becker/Braun, Kunststoffhandbuch [Plastics Handbook] 2/1 (polyvinyl chloride), 2nd edition, edited by H. K. Felger, Hanser Verlag, 1985 (Gerhard W. Becker, Dietrich Braun, Kunstoff-Handbuch: 2. Polyvinylchlorid; 1.-2. völlig neu bearb. Aufl.; München, Wien: Carl Hanser, 1985).

2) Charles E. Wilkes, James W. Summers, Charles A. Daniels (Eds.), PVC Handbook, Hanser Verlag 2005.

The polyvinyl chloride (PVC) produced according to the invention has a median grain size ($d_{50}$, based on by-volume statistical analysis) of from 10 to 80 µm. Preferably, the PVC produced according to the invention has a median grain size of from 10 to 60 µm; especially from 20 to 50 µm. The median grain size is preferably determined in accordance with ISO 13320:2009.

The process of the present invention is described in detail below:

Water, one or more initiators and adjuvants, such as antioxidants, pH regulators etc. are introduced as initial charge into a polymerization autoclave. Then some of the vinyl chloride (VC) to be polymerized is added (for example 20-80% by weight). The order is dependent upon the technical capacities of the equipment and can be chosen as desired. As initiator there can be used one or more organic diacyl peroxides, peroxy esters, peroxodicarbonates or similar compounds, such as, for example, azo compounds. The antioxidant is, for example, a sterically hindered phenol. To adjust the pH value, one or more compounds, such as, for example, citric acid, sodium bicarbonate and/or a different buffer salt, are used.

By stirring with a stirring device or a dispersing or homogenizing device (for example a high-speed stirrer, a rotor-stator system or a homogenizing pump with a suitable aperture or suitable slot), the constituents of the composition are intimately mixed. By the addition of one or more suspension auxiliaries (such as, for example, a polyvinyl alcohol that contains between 10 and 60 mol % acetate groups, hydroxypropylmethylcellulose ether, gelatin or the like), with continued dispersion, the droplet size is stabilized and, for example, a median droplet size of 10-80 µm, preferably 20-40 µm, is established. If desired, it is also possible for one or more ionic and/or non-ionic surfactants (for example alkanesulfonates, sorbitan esters) to be used in order to facilitate the adjustment of the droplet size by lowering the interfacial tension. The polymerization is started by the heating of the reaction mixture and by the resulting decomposition of initiator.

The addition of the remaining VC can be begun as early as during the heating phase. Preferably, the addition of the remaining VC (20-80% by weight) is started once the polymerization temperature has been reached. The addition of VC should take place over a relatively long period and should preferably end when the customary pressure drop begins towards the end of the polymerization. Preferably, the addition of VC is carried out in such a way that the rate of addition corresponds at least to the rate of conversion, i.e. of the conversion of monomer to polymer, or exceeds that rate. The addition of additional VC should, however, at least compensate for the shrinkage in volume that results from the conversion taking place. This is preferably effected in such a way that, during the polymerization period, the shrinkage in volume is at all times at least balanced by addition of the remaining vinyl chloride. This can be effected, for example, by measurement of the fill level in the reactor or by a mathematical model developed on the basis of experiments. The addition of VC is preferably effected continuously or (for example intermittently) in a plurality of portions. The addition of VC can be coupled by means of a corresponding regulating device, for example to the internal pressure and/or fill level of the autoclave.

The polymerization usually takes place isothermally. It is also possible, however, to choose a process in which the internal temperature is varied over the polymerization period.

The polymers so produced can be worked up in accordance with known procedures. For that purpose, the polymer is first freed of unreacted monomers. The further working-up of the aqueous polymer dispersions to form dry powder can likewise be effected in accordance with known methods.

This is usually carried out in two steps: in the first step, most of the aqueous phase is removed, for example by decanting, centrifugation or filtration. If desired, a washing process (for example with water) can be used to reduce the content of polymerization adjuvants in the material, which adjuvants can have adverse effects in many applications. In the second step, the resulting moist material can be dried under the action of warm air. Various drying devices are suitable for this purpose, such as, for example, flow dryers, drum dryers, fluidized bed dryers or combinations of drying devices.

The process according to the invention and the PVC or PVC resin which can be produced according to the invention are distinguished by the following advantages over the prior art:

- due to the subsequent addition of VC, the PVC particles obtained have a more uniform shape, are rounder and less porous than when all the vinyl chloride is used as initial charge;
- due to the lower amount of VC in the initial charge and accordingly during the homogenisation or dispersion phase and during the starting phase of the polymerisation, in comparison with the conventional process (without the addition of monomer during the polymerisation phase), smaller amounts of polymerization adjuvants (suspension auxiliaries, surfactants, etc.) are required per tonne of PVC;
- the water consumption per tonne of PVC is reduced. By virtue of the spherical and non-porous structure, it is possible, with suitable stirring, to obtain a higher phase ratio of PVC/water at the end of the polymerization when compared with a conventional process. The addition of water to compensate for shrinkage during the polymerization, which is a common practice in the production of PVC suspension polymers, is not necessary. The higher solids content ultimately achieved results in an increase in yield per batch, i.e. in reactor output, and in a reduction in the amount of waste water formed per tonne of PVC;
- the spherical non-porous particles allow significantly larger amounts of water to be separated from the solid during mechanical dewatering in the decanter (centrifuge) or filtration. The energy input required for drying by evaporation of the residual water is correspondingly smaller;
- by virtue of the smaller surface areas for adsorption of water and by virtue of the lack of porosity of the PVC grain, the drying process can be carried out in a shorter time and more efficiently. This is assisted by the reduction in the specific amounts required (proportion by weight of adjuvant used per amount of polymer produced), since most polymerization auxiliaries, such as protective colloids or surfactants, have hydrophilic or even hygroscopic properties;
- by virtue of the spherical structure and the smoother surface, the total interface between polymer and organic phase in a plastisol is reduced, with the result that in plastisol applications the viscosity is reduced to a significantly greater extent than with PVC extenders that have been produced according to known processes wherein all the vinyl chloride is introduced as initial charge (before the heating phase).

EXAMPLES

The amounts of polymerization adjuvants given in ppm relate to the total amount of VC.

Example 1

According to the Invention 150 l of water are introduced into a 400 l autoclave as initial charge and then the polymerization adjuvants (dilauroyl peroxide 560 ppm, diethylhexyl peroxodicarbonate 310 ppm, citric acid 130 ppm, sodium nitrite 4 ppm) are added. 109 kg of vinyl chloride are then added and the mixture is stirred for 10 min. 21.9 l of a 4% by weight polyvinyl alcohol solution (polyvinyl alcohol containing 22 mol % acetate groups, 4450 ppm) are then added to stabilize the droplets. The reaction mixture is then heated (polymerization temperature=61° C.). Once the polymerization temperature has been reached, 83 kg of VC are added continuously at a rate of 21 kg/h. The rate of VC addition was chosen so that when the pressure drop begins all 83 kg will have been added. The polymerization is completed when a pressure drop of 2 bar has been reached. Then the customary working-up (de-monomerisation and drying) is carried out: the resulting dispersion is freed of unreacted monomer by applying a vacuum and blowing in steam. Most of the water is removed with the aid of a centrifuge; the end product is dried under the action of warm air.

Example 2

According to the Invention 150 l of water are introduced into a 400 l autoclave as initial charge and then the polymerization adjuvants (dilauroyl peroxide 560 ppm, diethylhexyl peroxodicarbonate 311 ppm, citric acid 110 ppm, disodium hydrogen phosphate 40 ppm, sodium nitrite 4 ppm, sodium salt of sec.-alkane-sulfonate (C12-C17) 220 ppm) are added. 128 kg of vinyl chloride are then added and the mixture is stirred for 10 min. 23.9 l of a 2.9% by weight solution of hydroxypropylmethylcellulose ether (MHPC 100=3370 ppm, a hydroxypropylmethylcellulose ether, a 2% by weight solution of which has a viscosity of 100 mPas at 20° C.) are then added to stabilize the droplets. The reaction mixture is then heated (polymerization temperature=60° C.). Once the polymerization temperature has been reached, 77 kg of vinyl chloride are added continuously at a rate of 38 kg/h. The rate of the vinyl chloride addition was chosen so that when the pressure drop begins all 77 kg will have been added. The polymerization is completed when a pressure drop of 2 bar has been reached. Then the customary working-up (de-monomerisation and drying analogously to Example 1) is carried out.

Example 3

Comparison Example for 1

150 l of water are introduced into a 400 l autoclave as initial charge and then the polymerization adjuvants (dilauroyl peroxide 560 ppm, diethylhexyl peroxodicarbonate 310 ppm, citric acid 220 ppm, sodium nitrite 4 ppm) are added. 128 kg of vinyl chloride are then added and the mixture is stirred for 10 min. 30 l of a 4% by weight, aqueous polyvinyl alcohol solution (polyvinyl alcohol containing 22 mol % acetate groups=6000 ppm) are then added to stabilize the droplets. The reaction mixture is then heated (polymerization temperature=61° C.). The polymerization is completed when a pressure drop of 2 bar has been reached. Then the customary working-up (de-monomerisation and drying analogously to Example 1) is carried out.

Example 4

Comparison Example for 2

150 l of water are introduced into a 400 l autoclave as initial charge and then the polymerization adjuvants (dilauroyl peroxide 570 ppm, diacetyl peroxodicarbonate 610 ppm, citric acid 160 ppm, disodium hydrogen phosphate 80 ppm, sodium nitrite 5 ppm, sorbitan monolaurate 1500 ppm) are added. 128 kg of vinyl chloride are then added and the mixture is stirred for 10 min. 30 l of a solution of hydroxypropylmethylcellulose ether (MHPC 100=5400 ppm) are then added to stabilize the droplets. The reaction mixture is then heated (polymerization temperature=60° C.). The polymerization is completed when a pressure drop of 2 bar has been reached, and the customary working-up (de-monomerisation and drying analogously to Example 1) is carried out.

Analysis data of the Examples are listed in the following Tables 1 and 2:

TABLE 1

|  | Ex. 1 | Ex. 3 | Ex. 2 | Ex. 4 |
|---|---|---|---|---|
| K value | 63.5 | 63.5 | 63.8 | 64.0 |
| median grain diameter [μm]* | 30 | 26 | 34 | 37 |
| bulk density [g/l] | 639 | 568 | 631 | 565 |
| plasticizer absorption [%] | 5.1 | 8.5 | 6.5 | 8.5 |
| residual moisture after decanter [%] | 21.9 | 23.9 | 19.6 | 25.0 |
| grain distribution* |  |  |  |  |
| % by vol. > 10 μm | 94 | 91 | 91 | 100 |
| % by vol. > 20 μm | 80 | 69 | 80 | 94 |
| % by vol. > 45 μm | 16 | 2 | 18 | 38 |
| % by vol. > 63 μm | 0 | 0 | 0 | 10 |
| trickle test through R25 [s] | 1.8 | 2.8 | 2.3 | 4.5 |

*Measurement method: Beckmann Coulter LS13320; median grain diameter $d_{50}$ (by volume)

TABLE 2

|  | Formulation A | | Formulation B | |
|---|---|---|---|---|
| Paste viscosity [Pas] at | Example 1 | Example 3 | Example 1 | Example 3 |
| 1 s$^{-1}$ | 1.5 | 1.9 | 1.6 | 2.2 |
| 10 s$^{-1}$ | 1.37 | 1.69 | 1.89 | 2.74 |
| 100 s$^{-1}$ | 1.73 | 2.0 | 2.74 | 4.12 |
| 1000 s$^{-1}$ | 1.85 | 2.11 | 2.42 | 3.3 |

Formulation A: 50 phr of microsuspension PVC K value 80, 50 phr of extender, 45 phr of butylbenzyl phthalate/Texanol isobutyrate, Formulation B: 50 phr of micro-suspension PVC K value 70, 50 phr of extender, 50 phr of diisononyl phthalate

The invention claimed is:

1. Process for the production of polyvinyl chloride (PVC) having a median particle diameter of from 10 to 80 μm by polymerization of vinyl chloride, characterized in that the process comprises the following process steps:
   (a) introduction of water, initiator(s), optionally one or more adjuvants, and some of the vinyl chloride into a container as initial charge and mixing of the constituents;
   (b) dispersion, and addition of one or more suspension auxiliaries with continued dispersion;
   (c) heating of the mixture;
   (d) addition of the remaining vinyl chloride; and
   (e) working-up of the product, wherein in step (d) the addition of the remaining vinyl chloride is effected from the beginning of the heating phase to the beginning of the work-up.

2. Process according to claim 1, characterized in that the auxiliary is an antioxidant, an ionic or non-ionic surfactant, a molecule size regulator, a cross-linker or a pH regulator.

3. Process according to claim 1, characterized in that as suspension auxiliaries there are added one or more polyvinyl alcohols, cellulose ethers, gelatin or a combination thereof.

4. Process according to claim 1, characterized in that as initiator there is used an organic diacyl peroxide, a peroxy ester, a peroxodicarbonate, an azo compound or a combination of the above substance classes.

5. Process according to claim 1, characterized in that before or during step (b) an ionic surfactant, non-ionic surfactant, or ionic and non-ionic surfactant is added.

6. Process according to claim 1, characterized in that in step (b) dispersion is effected using a stirring device or a dispersing or homogenizing device.

7. Process according to claim 1, characterized in that in step (a) from 20 to 80% by weight of the total vinyl chloride are added.

8. Process according to claim 1, characterized in that in step (d) from 80 to 20% by weight of the total vinyl chloride are added.

9. Process according to claim 1, characterized in that in step (d) the addition of the remaining vinyl chloride is effected in such a way that the fill volume in the container changes by less than 10%.

10. The process of claim 9, wherein the fill volume in the container changes by less than 10% at all times.

11. Process according to claim 1, characterized in that in step (d) the addition of the vinyl chloride is effected continuously or in a plurality of portions.

12. The process of claim 11, wherein the plurality of portions are equal.

13. Process according to claim 1, characterized in that process steps (a) to (c) are carried out in the order indicated, simultaneously or in some other order.

\* \* \* \* \*